United States Patent [19]

Balz

[11] E Re. 29,964

[45] Reissued Apr. 17, 1979

[54] FINISHING APPARATUS HAVING GYRATIONAL AND ROTATIONAL MOTION-PRODUCING COMPONENTS

[75] Inventor: Gunther W. Balz, Kalamazoo, Mich.

[73] Assignee: Roto-Finish Company, Kalamazoo, Mich.

[21] Appl. No.: 781,741

[22] Filed: Mar. 28, 1977

Related U.S. Patent Documents

Reissue of:

[64] Patent No.: 3,990,188
Issued: Nov. 9, 1976
Appl. No.: 574,001
Filed: May 2, 1975

[51] Int. Cl.[2] ..... B24B 19/00
[52] U.S. Cl. ..... 51/7; 51/163.2
[58] Field of Search ..... 51/163, 103, 7, 313; 241/175

[56] References Cited

U.S. PATENT DOCUMENTS

| | | | |
|---|---|---|---|
| 3,435,567 | 4/1969 | Blundell | 51/313 |
| 3,464,674 | 9/1969 | Pick | 51/163.2 |
| 3,606,702 | 9/1971 | Balz | 51/163.2 |

*Primary Examiner*—Harold D. Whitehead
*Attorney, Agent, or Firm*—Gordon W. Hueschen

[57] ABSTRACT

A vibratory finishing machine having a fixed frame and a floating support resiliently mounted thereon, a finishing chamber mounted on the floating support, a gyratory motion-producing assembly affixed to the support eccentrically mounted on a shaft and a motor operatively coupled thereto. The finishing chamber is divided into two parts, one part rotatively mounted and having at least an inner vertical wall, and a stationary portion affixed to the floating support. A second motor is mounted in fixed relationship with the floating support and operatively coupled to rotate the rotatably-mounted portion of the chamber. The rotational or centrifugal rotation of the rotatably-mounted portion of the chamber provides greatly improved finishing efficiency of the apparatus. Additionally, the gyrational motion of the chamber produced by the first motor and accompanying eccentric weights may be used to provide automatic discharge of the parts, and may also be used for finishing parts operated either by itself or in combination with the centrifugal rotation produced by rotating the rotatable portion of the chamber.

34 Claims, 4 Drawing Figures

Fig. 1
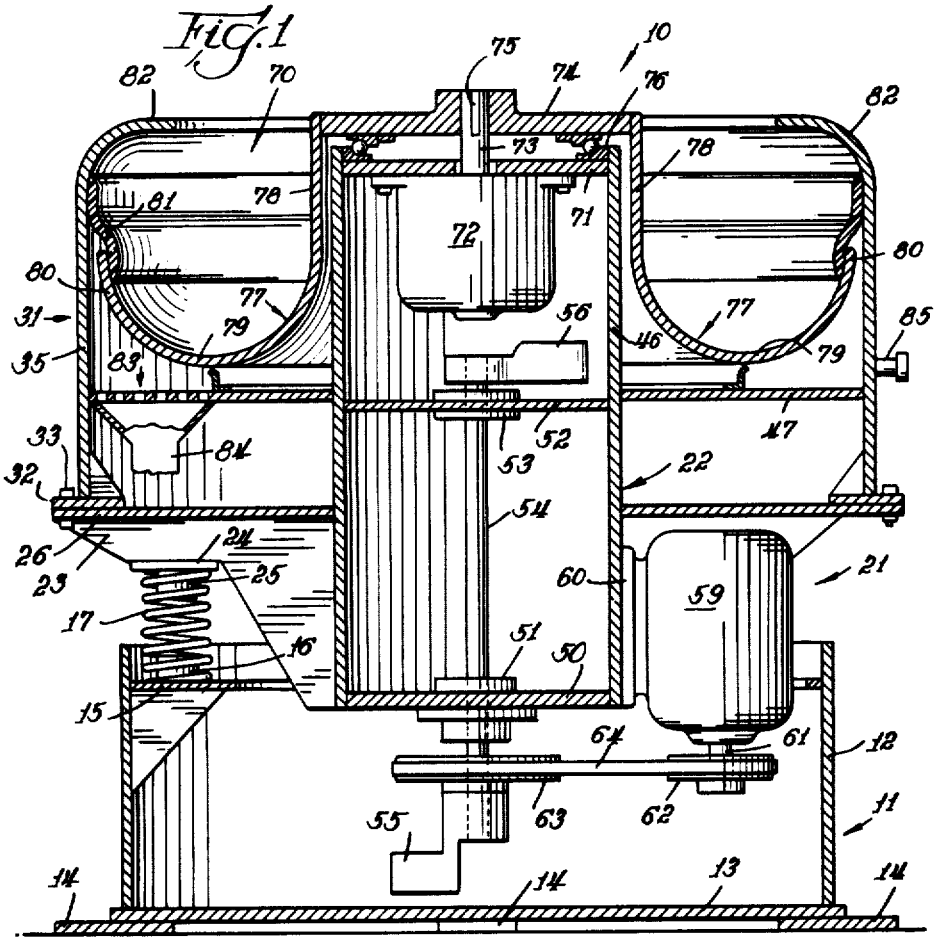
Fig. 2
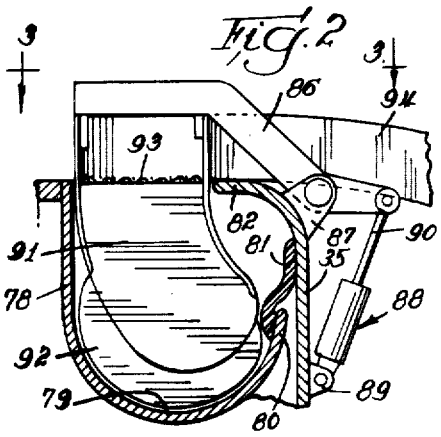
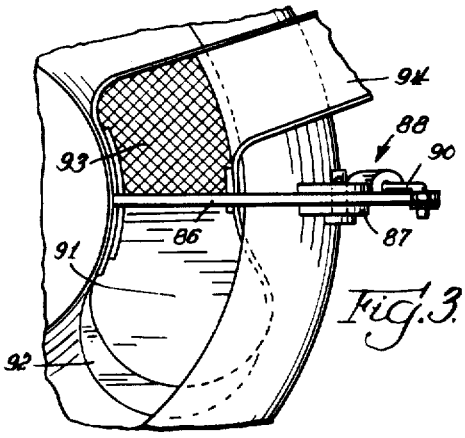
Fig. 3

FINISHING APPARATUS HAVING GYRATIONAL AND ROTATIONAL MOTION-PRODUCING COMPONENTS

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to a vibratory finishing machine having a curvilinear finishing chamber, and more particularly refers to such an apparatus having a vertically oriented gyratory motion-producing assembly and power driving means therefor.

2. Prior Art

Finishing machines and especially vibratory finishing machines are well known in the art. Such machines are used for various forms of finishing, such as burr removal, burnishing, and polishing. Such machines are disclosed and claimed in U.S. Pat. Nos. Re. 27,084, 3,400,495, 3,423,884, 3,435,564, 3,466,815, 3,606,702, and 3,633,321. Machines of the type described generally have a finishing chamber and a motor operatively mounted with respect to the chamber and arranged to cause eccentric weights to rotate or revolve, thereby producing vibratory motion of the finishing chamber. In one form disclosed in the prior art, a tub-type of finishing chamber, usually linear, has a motor with eccentric weights mounted on the shaft of the motor directly mounted to the tub, or a shaft with eccentric weights mounted to the tub and motor driven. In another type, the eccentric weights are mounted out of phase on a vertical shaft, causing the finishing chamber which is generally curvilinear to undergo gyratory motion. In either type, as a result of the vibratory movement, when materials such as parts and/or finishing materials are placed in the chamber, orbital motion is imparted to the contents so that they move upwardly at the peripheral portion of the chamber and downwardly at the inner portion of the chamber. This results in relative movement between the finishing material and parts, or at least interaction therebetween, causing the parts to be finished. Additionally, in the gyratory-type of finishing machine, by employment of a proper phase relationship between the eccentric or unbalance weights, varying degrees of precession or linear progression of the material and parts are caused circumferentially around the annular finishing chamber, as is well known in the art. Various forms of guides or vanes, including helical guides, have also been fixed internally of a finishing chamber to assist with such precession. See, for example, U.S. Pat. No. 3,071,900.

Prior art finishing machines, e.g., tumbling machines and vibratory finishing machines, such as described above, generally function well. However, in the interest of advancing the state of the art, it would be highly desirable to improve or increase the efficiency of operation of the apparatus, particularly in such times when the need to conserve energy becomes critical. Finishing machines having greater efficiency have been disclosed in one form utilizing a chamber which rotates and [has] *may have* a cover which is stationary, thereby causing repeated acceleration and deceleration of the parts and finishing material. Another finishing machine has been disclosed of the [ratory] *rotatory* type utilizing a rotating bottom.

However, these machines have have expensive to build and operate and have not provided the degree of improvement in efficiency desired. Additionally, the prior art rotational machines provide no means for automatically unloading or discharging the parts.

OBJECTS OF THE INVENTION

It is accordingly an object of the present invention to provide a vibratory finishing apparatus of the gyrational type having improved efficiency. It is an additional object to provide a finishing apparatus of the type described wherein the parts and finishing material may be subjected to both gyratory motion and rotational or centrifugal motion, either simultaneously or consecutively. It is still further an object to provide a vibratory finishing machine of the type described having means for readily removing finished parts from the finishing chamber. It is an additional object to provide an apparatus of the type described which may be readily and economically fabricated and operated. Still other objects will readily present themselves to one skilled in the art upon reference to the ensuing specification, the drawings, and the claims.

BRIEF DESCRIPTION OF THE DRAWINGS

In the drawings,

FIG. 1 is a side elevation view, partly in cross-section, of a vibratory and rotational finishing machine according to one embodiment of the invention, FIG. 2 is a fragmentary elevational view of an apparatus for removing parts from the finishing chamber, FIG. 3 is a top view taken at the line III—III of FIG. 2, and FIG. 4 is a side elevational view partly in cross-section, of a vibratory finishing machine comprising another embodiment of the invention.

DESCRIPTION OF THE PREFERRED EMBODIMENTS

Figure 11:
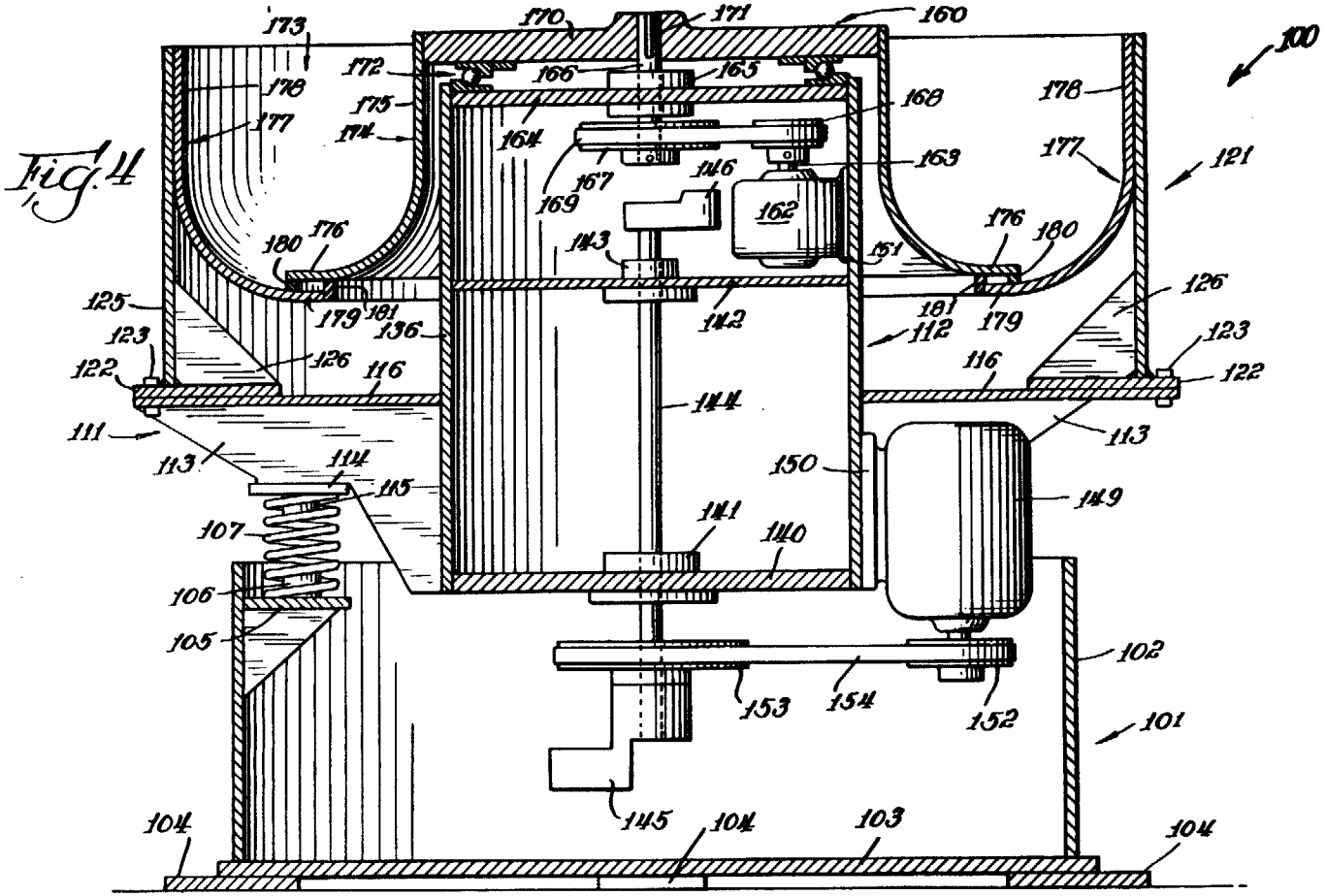

Referring to FIG. 1, a vibratory finishing apparatus 10 is shown comprising a fixed base 11 having a cylindrical wall 12, a bottom 13, square footplates 14, and a radially directed annular flange 15. Spring-engaging protuberances 16 are affixed to the flange 15 for engaging one end of coil springs 17. Alternatively, a resilient material such as rubber or other elastic materials may be utilized in place of coil springs.

A floating supporting assembly 21 comprises a central tubular gyratory motion-producing assembly 22 and sheetform radial supports 23. The radial supports 23 have square plates 24 affixed thereto on one edge which are provided with spring-engaging protuberances 25 on the other surfaces of the plates which engage the upper ends of the coil springs 17. Horizontal radial supporting arms 26 are affixed to the radial supports 23 by means such as welding. The radial supports 23 and the radial supporting arms 26 are welded to each other and to the central tube assembly 22.

Mounted on the floating support assembly 21 is an annular finishing chamber or tub assembly 31. The finishing chamber assembly 31 has an annular member 32 detachably affixed to the radial supporting arms 26 by means of bolt and nut assemblies 33. Affixed to the member 32 by means such as welding is an outer vertically-arranged tubular finishing chamber support 35.

The gyrational motion-producing portion of the apparatus comprises a tubular housing 46 affixed to the radial supporting arms 26 and an annular plate 47. A lower bearing support plate 50 is mounted at the bottom of the tubular housing 46 and supports a bearing 51 mounted thereon, and an upper bearing supporting plate 52 having a bearing 53 mounted thereon is mounted at the top of the tubular housing 46. An eccentric weight supporting shaft 54 is rotatably journaled in the bearings 51 and 53 and has a lower eccentric or unbalance weight 55 and an upper eccentric or unbalance weight 56 mounted at the ends thereof and out of phase with each other.

A motor 59 is mounted by means of a mounting plate 60 on the outer surface of the tubular housing 46 at the lower end thereof. Alternative mountings are possible. A motor shaft 61 has a pulley 62 affixed thereto which is operatively connected to a pulley 63 mounted on the shaft 54 by means of an endless flexible belt 64. Alternatively, gears, sprockets and a chain, or other usual driving connections between a motor shaft and a second shaft, may replace the pulleys and belt.

A rotatable finishing chamber assembly 70 comprises a motor mounting plate 71 having a motor 72 mounted thereon. The motor shaft 73 has a turntable 74 mounted thereon and connected to the shaft by means of a key 75. The turntable rotates on a ball-bearing assembly 76.

The finishing chamber 77 is comprised of several portions. The first portion is a rotating portion and is comprised of an inner vertical wall 78 affixed at its lip to the turntable 74, an arcuate bottom 79, and a partial outer vertical wall 80. The remainder of the rotating portion of the chamber comprises an annular sealing member 81, of a material such as rubber or neoprene, adhesively affixed at its lower tip to the vertical wall 80, and having its upper portion engaging the outer finishing chamber support wall 35. The chamber is completed by an inwardly directed radial flange 82 forming an extension of the finishing chamber support 35.

The finishing apparatus is additionally provided with a foraminous separation area 83 and a capped hose connection 85. Liquids or other material introduced through the hose connection 85 may be removed through the foraminous area 83 and a discharge duct 84.

Referring to FIGS. 2 and 3, a part retrieval apparatus is shown mounted on the support 35 and comprising a lever arm 86 pivotally mounted on an ear 87 affixed to the wall 35. The lever arm 86 is operated by means of a hydraulic or air cylinder 88 or a solenoid having one end pivotally mounted to an ear mount 89 and a shaft 90 having its end pivotally mounted to one end of the lever arm 86. A ramp or scoop 91 having a rim 92 which may be formed of a resilient material such as neoprene to facilitate entrance into the finishing chamber and exit therefrom is affixed to the end of the lever arm 86.

A screen 93 is provided for separating finishing material from the parts, and is connected to one end of the ramp 91. A part discharge chute 94 is connected to the part retrieval apparatus at the screen 93.

Alternative forms of part retrieval apparatus may be utilized if desired. One form of apparatus is disclosed in U.S. Pat. No. 3,514,907 comprising a hingedly mounted gate in the side wall of the finishing chamber which may be opened and closed by means of a hydraulic cylinder. When the gate is opened, a retrieval apparatus comprising a ramp, screen, and discharge chute may be inserted into the recess resulting from opening the gate, and parts separated from the finishing material are discharged thereby. Alternatively, a so-called "chip pump" may be lowered into the finishing chamber and, as disclosed in U.S. Pat. No. 3,400,495, the parts separated and retrieved as taught in the disclosure of said patent.

To place the apparatus of FIG. 1 in operation, parts and the usual loose, aggregate type of finishing, e.g. resin bonded, ceramic, rock fragments, cob meal, or the like are placed in the finishing chamber 70. The motor 72 is then turned on, causing the turntable 74 to rotate and thereby causing the rotatable portion 77 of the finishing chamber 70 to rotate. As a result of the rotation, the parts and finishing material revolve within the chamber. The parts and finishing material acquire velocity and are subjected to centrifugal force, causing them to rise along the partial outer vertical wall 80 which also rotates, and as they reach the end of the rotating portion of the chamber and rise along the sealing member 81, they engage the wall 35 and the radial flange 82, both of which are stationary. This causes a sudden reduction in velocity of revolution of the parts and finishing material, thereby causing them to fall to the rotating bottom 79 of the finishing chamber where the parts and finishing material suddenly encounter rotational movement of the chamber once again and are once again caused to revolve rapidly and to rise along the outer wall of the finishing chamber. The combination of acquiring velocity and rising upwardly along the chamber, and sudden reduction of velocity causing the parts and finishing material to fall again to the bottom of the chamber, the parts and finishing material engaging in numerous cycles of such movement, results in extremely efficient finishing of the parts.

When it is desired to remove the parts from the apparatus, the motor 72 is stopped and the motor 59 turned on. This causes conventional gyrational movement of the finishing chamber, as described in the aforementioned patents, causing the parts and finishing material to undergo orbital motion within the chamber and additionally causing precession of the parts and finishing material linearly along the annular chamber. The retrieval apparatus shown in FIGS. 2 and 3 may then be utilized, actuating the cylinder 88 to extend the piston rod 90 to cause the ramp 91 to be inserted within the finishing chamber. As gyrational movement of the finishing chamber causes precession of the parts and finishing material, they encounter the ramp 91, the parts rising up along the ramp's incline and the finishing material falling through the foraminous mesh of the screen 93 and returning to the bottom of the finishing chamber. The parts continue to travel along the discharge chute and are discharged from the finishing chamber. Alternatively, the parts may be trapped by means of a basket, the basket being inserted and withdrawn by actuating a hydraulic cylinder, such as the cylinder 88.

Although the application of rotational motion to the finishing chamber and gyrational motion thereto have been described as being applied consecutively or sequentially, alternatively, if desired, both motions may be applied simultaneously. The parts and finishing material will then undergo a very complicated pattern which results in extremely efficient finishing of the parts. Additionally, a rotational cycle and a gyrational cycle may be applied alternatively for finishing, and in either order. However, the gyrational cycle should always be utilized for separating the parts after finishing is complete.

Referring to FIG. 4, a finishing apparatus 100 is shown comprising another embodiment of the invention. The apparatus comprises a fixed base 101 having a cylindrical wall 102 and a bottom 103. The bottom 103 rests on square footplates 104. At the upper portion of the cylindrical wall 102 is an annular flange 105 having protuberances 106 engaging coil springs 107. Although not shown, the spring arrangement is utilized at four positions to support the finishing chamber.

A floating supporting assembly 111 supports a gyrational motion assembly 112 and comprises radial support 113 having square plates 114 affixed thereto by welding with protuberances 115 affixed to the square plates engaging the upper end of the springs 107. Radial supporting arms 116 are affixed to the radial supports 113.

The finishing chamber assembly 121 comprises an annular member 122 affixed by bolt and nut assemblies 123 to the radial supporting arms 116. An outer finishing chamber support 125 is affixed to the annular member 122 by gussets 126 welded thereto.

The gyratory motion-producing assembly comprises a tubular housing 136 mounted to the radial supporting arms 116 and to the radial supports 113. Affixed to the housing 136 are a lower bearing support plate 140 having a bearing 141 mounted thereon, an upper bearing support plate 142 having a bearing 143 mounted thereon, and an eccentric weight-supporting shaft 144 journaled in the bearing 141 and 143. A lower eccentric weight 145 is mounted on and affixed to the lower end of the shaft 144, and an upper eccentric weight 146 is mounted on and affixed to the upper end of the shaft 144. Generally the weights are mounted out of phase with each other by a predetermined amount to give the desired type of gyrational movement and the desired type of precessional movement of the parts and finishing material, as is well known in the art. A motor 149 is mounted by means of a motor mounting plate 150 on the tubular housing 136, and is provided with a pulley 152 on the shaft thereof. Another pulley 153 is mounted on the shaft 144 and operatively connected to the pulley 152 by means of a flexible endless belt 154. Alternative shaft-connecting means may also be employed.

The rotatable finishing assembly 160 of the invention comprises a motor mounting plate 161 having a motor 162 mounted thereon having a motor shaft 163. A bearing mounting plate 164 is affixed to the tubular housing 136 having a bearing 165 mounted thereon in which a shaft 166 is journaled. The shaft 166 has a pulley 167 mounted thereon operatively connected to a pulley 168 mounted on the motor shaft 163 by means of a flexible endless belt 169. Alternative shaft-connecting means may also be employed. A turntable 170 is mounted at the end of the shaft 166 and [rotatable] *rotatably* engaged with the shaft by means of a key 171. The turntable 170 is supported on the bearing mounting plate 164 by means of a ball bearing assembly 172.

A finishing chamber 173 comprises a rotating chamber member 174 having a vertical wall 175 affixed to the turntable 170 and a partial arcuate bottom 176. A fixed chamber member 177 comprises a vertical wall 178 affixed to the outer finishing chamber support 125 and a partial arcuate bottom 179. A flexible annular sealing member 180, of a material such as rubber or neoprene or any other type of elastic material, is affixed to the arcuate bottom 176 and provides wiping or sealing action against the arcuate bottom 179 to prevent finishing material from passing therebetween. A flexible annular sealing member 181 of a similar material is affixed to the partial arcuate bottom 179 and provides wiping or sealing action against the surface of the partial bottom 176. The two sealing members cooperate to prevent any parts or finishing material from leaving the finishing chamber during rotation of the chamber.

Operation of the embodiment shown in FIG. 4 is very similar to that of the apparatus shown in FIGS. 1–3. Actuation of the motor 162 causes the rotating chamber member 174 to rotate and to impart centrifugal force to the contents within the chamber causing the contents including the parts and finishing material to move outwardly to the outer portion of the finishing chamber which is stationary. This causes the parts and finishing material to lose linear velocity caused by their revolution about the axis of the turntable, thereby permitting them to return to the bottom of the trough which is stationary, and then onto the portion which is rotating, thereby initiating another cycle of revolutionary movement and cessation of revolutionary movement. In effect, the path of the parts and finishing material will be somewhat sinusoidal, alternating between the fixed and moving portions of the finishing chamber. This results in extremely efficient finishing of the parts. If desired, the motor 149 may be turned on at the same time that the motor 162 is operating to provide simultaneous and combined rotational movement of the finishing chamber together with gyrational movement. This results in the parts and finishing material following a very complicated pattern which is the resultant of the two superimposed motions. For certain purposes this can result in improved efficiency in finishing the parts.

The parts may be separated from the finishing material and removed from the apparatus in much the same way as shown and described in conjunction with the embodiment of FIGS. 1–3. To accomplish this process, the rotational motion-producing motor 162 is stopped and the gyrational motion-producing motor 149 turned on. This causes the parts and finishing material to undergo a combination of orbital motion and linear precession. When the parts and finishing material encounter a conventional ramp and screen assembly, such as shown in FIGS. 2 and 3, the parts and finishing material ride up the ramp 91 as a result of the precessional motion, the finishing material passes through the screen 93 and returns to the finishing chamber, and the parts ride up the screen 93 and are discharged from the discharge chute or trough 94.

As in the case of the embodiment shown in FIGS. 1–3, the rotational and gyrational portions of the finishing process may be used sequentially, alternatively, or simultaneously.

The finishing apparatus of the present invention has a number of advantages over finishing machines known in the prior art. The finishing produced by the rotational portion of the finishing cycle is extremely efficient as a result of the continually rising and falling parts and finishing material, in some cases being more efficient than finishing apparatus having means only for producing gyrational motion. The apparatus has advantages over rotational finishing machines disclosed in the art in that it provides for automatic discharge of parts after the finishing process is complete, whereas in previously-disclosed machines, the parts must be removed by hand. Further, the present apparatus enables both the rotational finishing motion and gyrational finishing motion to be utilized simultaneously, in some cases providing finishing efficiency even exceeding that of the rotational types when used alone. Additionally, the apparatus is compact and requires no more space than that required by conventional gyrational motion-producing finishing machines. Also, facilities for producing both types of motion may be relatively inexpensively provided.

It is to be understood that the invention is not to be limited to the exact details of operation or structure shown and described, as obvious modifications and equivalents will be apparent to one skilled in the art.

I claim:

1. A vibratory machine useful for finishing the surfaces of a part with finishing material comprising:

1. a gyratory motion-producing assembly comprising:
   a. a housing,
   b. eccentric weight means mounted for rotational movement about a vertical axis fixed with respect to said housing, and
   c. a motor mounted and operatively arranged to rotate said eccentric weight means,
2. means resiliently supporting said assembly for gyratory motion,
3. a substantially horizontally oriented curvilinear finishing chamber operatively mounted for gyration with said gyratory motion-producing assembly, comprising:
   a. a first annular member mounted with respect to said housing (1a),
   b. a second annular member coaxially mounted with respect to said first annular member, one of said first and second annular members arranged to rotate about a substantially vertical axis with respect to the other, and
   c. an annular sealing member mounted on one of said annular members and sealingly engaging the other of said annular members, and
4. a rotational motion-producing assembly fixedly mounted with respect to said housing (1a) comprising:
   a. rotatable support means mounted to rotate about a vertical axis,
   b. a motor mounted to rotate said rotatable support means, the rotatable one of said annular members being mounted on said rotatable support means, whereby said annular member may be rotated with respect to the other of said annular members, and
5. means for separating said part from said finishing material and discharging said part.

2. A vibratory machine according to claim 1, wherein said first annular member and said second annular member have at least one vertical wall.

3. A vibratory machine according to claim 2, wherein said vertical wall is an inner wall.

4. A vibratory machine according to claim 3, wherein said vertical wall additionally has attached thereto at least a partial arcuate bottom.

5. A vibratory machine according to claim 3, wherein said inner wall additionally has an arcuate bottom and a partial outer vertical wall connected thereto.

6. A vibratory machine according to claim 5, wherein said first annular member is an outer vertical wall.

7. A vibratory machine according to claim 6, wherein said outer vertical wall has a convolute lip to prevent parts and finishing material from leaving said chamber during rotation of said second annular member.

8. A vibratory machine according to claim 5, wherein said sealing member is affixed to said second annular member and sealingly engages first annular member.

9. A vibratory machine according to claim 5, wherein said sealing member is affixed to said first annular member and sealingly engages said second annular member.

10. A vibratory machine according to claim 1, wherein said first and second annular members are substantially equal complementary members each having a vertical wall and a partial bottom, the edges of the bottoms of said annular members being in overlapping relationship.

11. A finishing machine according to claim 10, wherein the overlapping bottom portions each have a sealing member affixed thereto and sealingly engage the other member.

12. A finishing machine according to claim 1, wherein said sealing member is formed of an elastomeric material.

13. A finishing machine according to claim 12, wherein said sealing member is formed of rubber.

14. A finishing machine according to claim 12, wherein said sealing member is formed of neoprene.

15. A finishing machine according to claim 1, having retrieval means for retrieving parts from said finishing chamber.

16. A finishing machine according to claim 15, wherein said retrieval means is arranged to be inserted into said finishing chamber and comrises a ramp, a finishing material separating foraminous member, and a discharge chute.

17. A finishing machine according to claim 15, wherein solenoid means is provided for inserting and retracting said retrieval means.

18. A finishing machine according to claim 17, wherein a portion of said ramp is formed of a resilient material to facilitate insertion into and withdrawal from said finishing chamber.

19. A finishing machine according to claim 15, wherein a hydraulic cylinder means is provided for inserting and retracting said retrieval means.

*20. A vibratory machine useful for finishing the surfaces of a part with finishing material comprising:*

*1. a gyratory motion-producing assembly comprising:*
   *a. a housing,*
   *b. eccentric weight means mounted for rotational movement about a vertical axis fixed with respect to said housing, and*
   *c. a motor mounted and operatively arranged to rotate said eccentric weight means,*
*2. means resiliently supporting said assembly for gyratory motion,*
*3. a substantially horizontally oriented curvilinear finishing chamber operatively mounted for gyration with said gyratory motion-producing assembly, comprising:*
   *a. a first annular member mounted with respect to said housing (1a),*
   *b. a second annular member coaxially mounted with respect to said first annular member, one of said first and second annular members arranged to rotate about a substantially vertical axis with respect to the other, and*
*4. a rotational motion-producing assembly fixedly mounted with respect to said housing (1a) comprising:*
   *a. rotatable support means mounted to rotate about a vertical axis,*
   *b. a motor mounted to rotate said rotatable support means, the rotatable one of said annular members*

*being mounted on said rotatable support means, whereby said annular member may be rotated with respect to the other of said annular members, and*

*5. means for separating said part from said finishing material and discharging said part.*

*21. A vibratory machine according to claim 20, wherein said first annular member and said second annular member have at least one vertical wall.*

*22. A vibratory machine according to claim 21, wherein said vertical wall is an inner wall.*

*23. A vibratory machine according to claim 22, wherein said vertical wall additionally has attached thereto at least a partial arcuate bottom.*

*24. A vibratory machine according to claim 22, wherein said inner wall additionally has an arcuate bottom and a partial outer vertical wall connected thereto.*

*25. A vibratory machine according to claim 24, wherein said first annular member is an outer vertical wall.*

*26. A vibratory machine according to claim 25, wherein said outer vertical wall has a convolute lip to prevent parts and finishing material from leaving said chamber during rotation of said second annular member.*

*27. A vibratory machine according to claim 20, wherein said first and second annular members are substantially equal complementary members each having a vertical wall and a partial bottom, the edges of the bottoms of said annular members being in overlapping relationship.*

*28. A finishing machine according to claim 20, having retrieval means for retrieving parts from said finishing chamber.*

*29. A finishing machine according to claim 28, wherein said retrieval means is arranged to be inserted into said finishing chamber and comprises a ramp, a finishing material separating foraminous member, and a discharge chute.*

*30. A finishing machine according to claim 28, wherein solenoid means is provided for inserting and retracting said retrieval means.*

*31. A finishing machine according to claim 30, wherein a portion of said ramp is formed of a resilient material to facilitate insertion into and withdrawal from said finishing chamber.*

*32. A finishing machine according to claim 28, wherein a hydraulic cylinder means is provided for inserting and retracting said retrieval means.*

*33. Apparatus of claim 1 wherein at least the inner annular member rotates.*

*34. Apparatus of claim 33 wherein the finishing chamber has a bottom, which bottom rotates.*

* * * * *

UNITED STATES PATENT AND TRADEMARK OFFICE

CERTIFICATE OF CORRECTION

PATENT NO. : Re. 29,964

DATED : April 17, 1979

INVENTOR(S) : Gunther W. Balz

It is certified that error appears in the above-identified patent and that said Letters Patent are hereby corrected as shown below:

[56] References Cited, U.S. Patent Documents, line 1, first column, reference No. "3,435,567" should read -- 3,435,565 -- See original patent (patent No. 3,990,188), title page, References Cited, United States Patents, first line, first column.

Col. 2, line 3; "have have" should read -- have been --

Col. 8, line 29; "comrises" should read -- comprises --

Signed and Sealed this

*Twenty-sixth* Day of *February 1980*

[SEAL]

*Attest:*

SIDNEY A. DIAMOND

*Attesting Officer*

*Commissioner of Patents and Trademarks*